(12) United States Patent
Wang et al.

(10) Patent No.: US 6,944,109 B2
(45) Date of Patent: Sep. 13, 2005

(54) AUTOMATIC CONTROL METHOD FOR GENERATING STABLE LASER POWER OF AN OPTICAL DISK DRIVE

(75) Inventors: Chung-Chen Wang, Taipei Hsien (TW); Sheng-Hwi Huang, Taipei Hsien (TW)

(73) Assignee: Aopen Inc., Hsi-Chih (TW)

( * ) Notice: Subject to any disclaimer, the term of this patent is extended or adjusted under 35 U.S.C. 154(b) by 491 days.

(21) Appl. No.: 10/064,108

(22) Filed: Jun. 12, 2002

(65) Prior Publication Data
US 2003/0099177 A1 May 29, 2003

(30) Foreign Application Priority Data
Nov. 23, 2001 (TW) .................................. 90129132 A (51) Int. Cl.⁷ .............................................. G11B 7/125
(52) U.S. Cl. .................................. 369/53.26; 369/116
(58) Field of Search ............................. 369/116, 53.26, 369/53.27, 47.5, 47.51, 47.52, 47.53

(56) References Cited

U.S. PATENT DOCUMENTS

| | | | | |
|---|---|---|---|---|
| 4,580,044 A | * | 4/1986 | Hongo et al. | 369/116 |
| 4,692,606 A | * | 9/1987 | Sakai et al. | 369/116 |
| 5,119,360 A | * | 6/1992 | Minakuchi | 369/116 |
| 5,712,839 A | * | 1/1998 | Aoki | 369/47.52 |
| 5,742,566 A | * | 4/1998 | Imai | 369/116 |
| 6,246,659 B1 | * | 6/2001 | Suzuki et al. | 369/116 |
| 6,317,400 B1 | * | 11/2001 | Yanagawa et al. | 369/53.26 |
| 6,333,909 B1 | * | 12/2001 | Zaima | 369/53.27 |
| 6,359,847 B1 | * | 3/2002 | Shimizu | 369/53.26 |
| 6,665,242 B2 | * | 12/2003 | Nishikawa | 369/47.5 |

* cited by examiner

Primary Examiner—Brian E. Miller
Assistant Examiner—Peter Vincent Agustin
(74) Attorney, Agent, or Firm—Winston Hsu (57) ABSTRACT

An optical disk drive has a pick-up head for emitting laser beams, and an analog front-end circuit controlled by a microprocessor for controlling the operation of the pick-up head. An automatic control method for generating stable laser power of the optical disk drive includes getting a power reference function measured by a fixed quantity of optical disk sample drives, establishing the relationship between the laser power control signal of pick-up head from the analog front-end circuit by the microprocessor, and calculating the difference amount from a feedback signal minus a reference voltage on pick-up head side to generate a first function. When the analog front-end circuit receives this feedback signal, this method will be enabled automatically and adjust the first function of the laser power control signal to approach the reference function so as to adjust the intensity of the laser power generated by the pick-up head.

30 Claims, 7 Drawing Sheets

AUTOMATIC CONTROL METHOD FOR GENERATING STABLE LASER POWER OF AN OPTICAL DISK DRIVE

BACKGROUND OF INVENTION

1. Field of the Invention

The present invention relates to a method for controlling laser power of an optical disk drive, and more particularly, to an automatic control method using a feedback mechanism to steady laser power of an optical disk drive.

2. Description of the Prior Art

Management of documents is an important concern for both companies and individuals. In the past, all documents were printed or written on paper. This method is very inconvenient as the number of documents continues to increase. As computer technology develops day-by-day, digital data is widely used and stored in computer storage media. In order to make storing digital data more convenient, many data storage devices have been developed such as writable compact disk drives. The optical disk drive has a low cost and a light volume, but a high storage capacity, making storing data more convenient.

Figure 1:
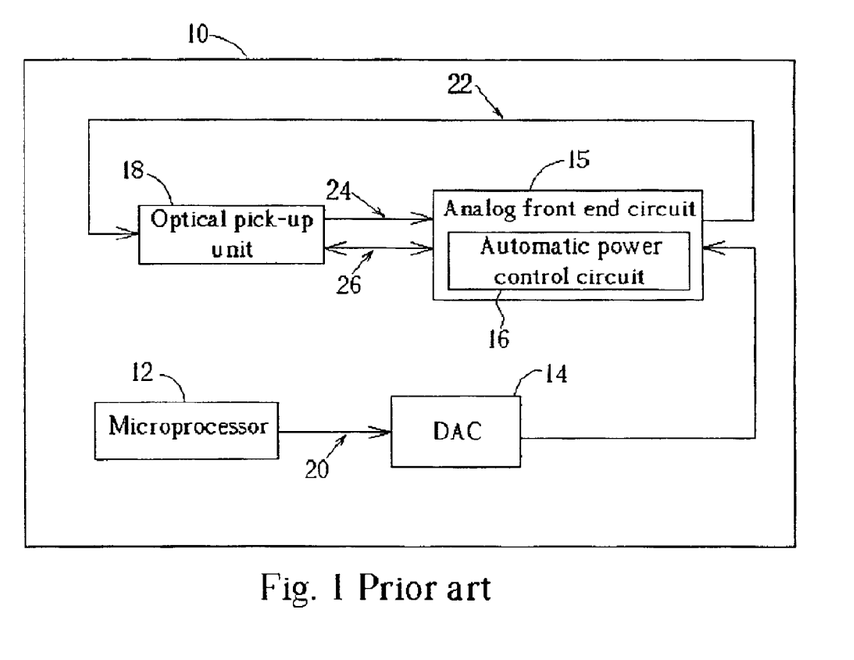
FIG. 1 is a perspective view of a laser power control device according to a prior art optical disk drive.

Please refer to FIG. 1. FIG. 1 is a perspective view of a laser power control device 10 according to a prior art optical disk drive. The laser power control device 10 comprises a microprocessor 12, a digital to analog converter (DAC) 14, an analog front end (AFE) circuit 15, and an optical pick-up unit 18. The microprocessor 12 outputs a control signal 20 to the DAC 14. The DAC 14 converts the digital control signal 20 into an analog control signal and then transmits the converted analog control signal to the analog front end circuit 15. The initial control signal 20 is a reference signal that is used to control the optical pick-up unit 18 to generate a suitable laser power. The analog front end circuit 15 generates a corresponding writing voltage 22 according to the control signal 20 so as to control the laser power outputted from the optical pick-up unit 18. That means the optical pick-up unit 18 can output different laser power levels according to different writing voltages 22. When the optical pick-up unit 18 outputs laser beam, the laser beam is bisected by a prism. A greater part of the laser beam goes through the prism along the original optic path and then outputs to an optical disk. The smaller part of the laser beam is refracted by the prism and then arrives to a front photo diode. The front photo diode converts the laser beam into a watching signal 24. The watching signal 24 is used to monitor a status of the laser power outputted from the optical pick-up unit 18. If the optical pick-up unit 18 outputs a greater laser power, the power of the laser beam that is refracted by the prism will also be greater. Therefore, users can know the variation of the laser power outputted from the optical pick-up unit 18 according to the variation of the watching signal 24. The analog front end circuit 15 provides a reference voltage 26 to be a reference voltage of the watching signal 24. The analog front end circuit 15 comprises a automatic power control (APC) circuit 16. The automatic power control circuit 16 adjusts the writing voltage 22 according to a difference amount between the watching signal 24 and the reference voltage 26 so as to steady the laser power outputted from the optical pick-up unit 18. For example, the decided value of the laser power outputted to the optical disk from the optical pick-up unit 18 is X. When laser power of X is outputted, a watching signal 24 of VI voltage is generated at the same time. If the reference voltage 26 provided by the analog front end circuit 15 is V2, then the difference amount between the watching signal 24 and the reference voltage 26 is V1–V2. When the analog front end circuit 15 receives a watching signal 24 which has a voltage greater than V2 for the instable output of the optical pick-up unit 18, that means the laser power outputted from the optical pick-up unit 18 is greater than the decided value X at that time. Therefore, the analog front end circuit 15 use the automatic power control circuit 16 to decrease the writing voltage 22 so as to decrease the laser power outputted from the optical pick-up unit 18 at the same time. Therefore, the laser power control device 10 of the prior art optical disk drive uses the difference amount between the watching signal 24 and the reference voltage 26 to finely tune the writing voltage 22 so as to make the optical pick-up unit 18 output stable laser power.

However, the laser power control device 10 only forms a feedback mechanism between the analog front end circuit 15 and the optical pick-up unit 18 to steady the laser power outputted from the optical pick-up unit 18. When the optical pick-up unit 18 outputs the unsuitable writing power, it is unable to adjust the writing voltage 22 generated by the analog front end circuit 15 through the feedback mechanism. For example, when error caused by the laser power control device 10 makes interference, the optical pick-up unit 18 will output undesirable writing power. However, the laser power control device 10 can only use the feedback mechanism formed between the analog front end circuit 15 and the optical pick-up unit 18 to stably output the undesirable writing power. Therefore, the laser power control device 10 is unable to use the undesirable writing power to adjust the writing voltage 22 and to control the optical pick-up unit 18 to output suitable writing power.

In general, the optical disk drive must use an optimum power control (OPC) before writing data onto a disk so as to find out the most suitable writing power for the disk. The orange book has detailed description about the practice of the optimum power control, which is briefly described below.

Figure 2:
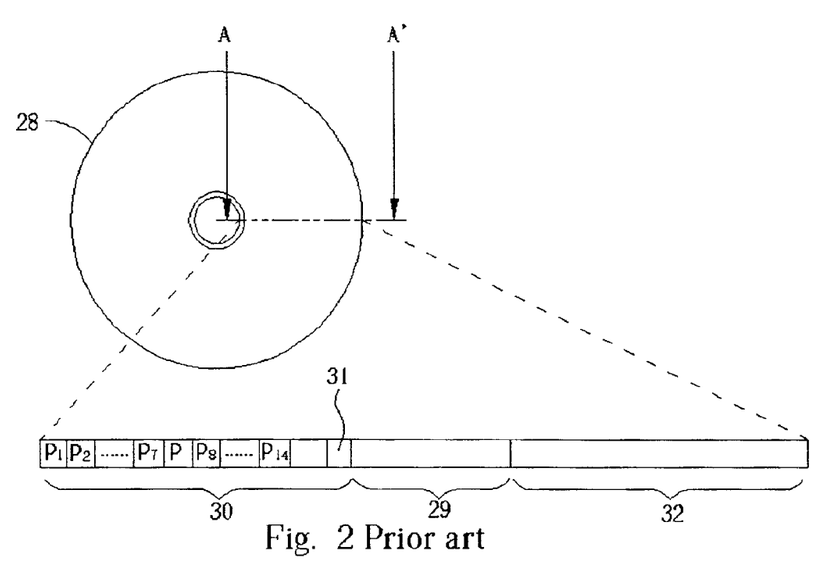
FIG. 2 is a perspective view of using the optimum power control according to the prior art.

Please refer to FIG. 2. FIG. 2 is a perspective view of using the optimum power control according to the prior art. When using the optimum power control, the optical pick-up unit 18 of the optical disk drive will first read an indicative optimum writing power P from a lead-in area 29 on the optical disk 28. The indicative optimum writing power P is a writing power suggested by the manufacturer of the optical disk. The optical pick-up unit 18 tests the writing operation in fifteen continuous test blocks 31 inside the test area 30 on the optical disk 28 by using seven writing powers P1~P7 that are smaller than the indicative optimum writing power P, the indicative optimum writing power P, and the seven writing powers P8~P14 that are greater than the indicative optimum writing power. In total, fifteen different writing powers are used.

Continuously, the optical pick-up unit 18 reads back the result of writing data into the test blocks 31. The read back signal is an alternating current coupled high frequency signal. The orange book has defined a symmetrical parameter $\beta$ with regard to the read back signal. If the symmetrical parameter $\beta$ of the read back signal conforms with the decided demands, the corresponding writing power can be the optimum writing power of the optical disk 28. Fifteen symmetrical parameter values ($\beta$) of the fifteen read back signals corresponding to the fifteen writing powers are generated after the optical pick-up unit 18 has read back the writing result of the fifteen writing powers. Then, the optical disk drive compares the fifteen symmetrical parameter values of the read back signals with a target $\beta$ stored in the lead-in area 29 of the optical disk. The writing power corresponding to a symmetrical parameter value of a read back signal, which has a minimum difference amount from the target β in the fifteen symmetrical parameter values of the read back signals, is the optimum writing power. If all the difference amounts between the fifteen read back signal parameters and the target β are greater than a decided value, none of the fifteen writing powers is suitable to be the practical writing power. In this case, the optical disk drive will use a preset value to be the writing power and write data into the writing area 32 of the optical disk 28.

However, errors are generated between the output laser power of the optical pick-up unit 18 and the writing voltage 22 and the deviation of the laser power is caused due to errors in optical elements and fabricating process. Besides, the resistance effect and noise interference generated by the electronic elements on the printed circuit board of the optical disk drive will influence the actual output voltage. Therefore, an error exists between the output voltage and the original decided value designed by the circuit. The errors generated by the optical pick-up unit 18 and the electronic elements make the optical pick-up unit 18 output a laser power that is too large or too small and exceeds the optimum power control range of the optical disk. The inefficacy of the optimum power control will not only influence the burning efficiency, but also calculate an unsuitable writing power. For example, when using the optimum power control, the optical pick-up unit 18 of the optical disk drive will first read an indicative optimum writing power P from a lead-in area 29 on the optical disk 28. The optical pick-up unit 18 tests the writing operation in fifteen continuous test blocks 31 inside the test area 30 on the optical disk 28 by using seven writing powers P1~P7 which are smaller than the indicative optimum writing power P, the indicative optimum writing power P, and seven writing powers P8~P14 which are greater than the indicative optimum writing power. All together, fifteen writing powers are used. However, the error generated by the optical disk drive makes the optical pick-up unit 18 emit a laser beam which deviates from the indicative optimum writing power P. The optical pick-up unit 18 is unable to get a suitable writing power from the fifteen test writing powers. Therefore, the optical pick-up unit 18 must use the heterodyne method or repeat to do the optimum power control to get the writing power. However, it is difficult to get a suitable writing power for the error of the output laser power. If the optical pick-up unit 18 outputs the unsuitable writing power, it will damage the chemical dyes on the optical disk and increase the error rate when reading data from the optical disk, or make the optical disk unusable for storing any further data. In order to calibrate the error, the prior art optical disk drive uses detecting instruments to calibrate the output laser power of the optical disk drive by manpower, through the procedure of testing and recombining the optical pick-up unit 18 many times, so as to make the laser power outputted from the optical disk drive lie inside the optimum power control range. Therefore, not only the production yield cannot be improved, but also the total production cost is increased.

SUMMARY OF INVENTION

It is therefore a primary objective of the claimed invention to provide an automatic control method for generating stable laser power of an optical disk drive, using the feedback mechanism to automatically calibrate the laser power so as to lower production cost and increase yield.

The claimed invention, briefly summarized, discloses an automatic control method for generating stable laser power of an optical disk drive. The optical disk drive comprises an optical pick-up unit for emitting laser beams, a microprocessor for generating control signals, and an analog front end (AFE) circuit. The analog front end circuit is used to receive the control signals generated by the microprocessor, generating a writing voltage for the optical pick-up unit according to the control signals so as to make the optical pick-up unit emit laser beams, to receive watching signals generated when the optical pick-up unit emits laser beams, and to adjust the writing voltage according to a difference amount between the watching signals and a reference voltage so as to adjust a magnitude of the laser beams emitted by the optical pick-up unit. The control method is to generate a first function according to a relationship between the control signals transmitted from the microprocessor to the analog front end circuit and the difference amount between the watching signals and the reference voltage. When the analog front end circuit receives the watching signal, the analog front end circuit adjusts the writing voltage according to the first function and a reference function so as to adjust the magnitude of the laser beams emitted by the optical pick-up unit.

It is an advantage of the claimed invention that the laser power control device of the claimed invention optical disk drive reduces the deviation of the output laser power caused by the error of the output laser power of the optical pick-up unit and the voltage drift of the electronic circuit, increasing the stability of output laser power control. In addition, the claimed invention optical pick-up unit uses automatic manner to adjust the output laser power. Therefore, it can decrease the error caused by using manpower to adjust the output laser power, resulting in cost decreases and yield increases.

These and other objectives of the claimed invention will be apparent to those of ordinary skill in the art after reading the following detailed description of the preferred embodiment, which is illustrated in the various figures and drawings.

DETAILED DESCRIPTION

Figure 3:
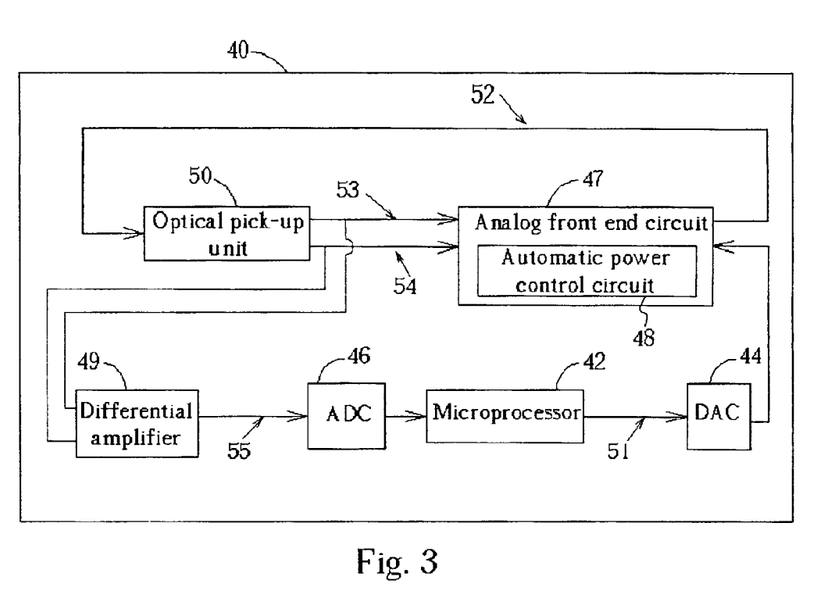
FIG. 3 is a perspective view of a laser power control device of the present invention optical disk drive.

Please refer to FIG. 3. FIG. 3 is a perspective view of a laser power control device 40 of the present invention optical disk drive. The laser power control device 40 comprises a microprocessor 42, a digital to analog converter (DAC) 44, an analog to digital converter (ADC) 46, an analog front end circuit 47, a differential amplifier 49, and an optical pick-up unit 50. The microprocessor 42 outputs a control signal 51 to the DAC 44 and then the DAC 44 converts the digital control signal 51 into the analog control signal and transmits the converted analog control signal into the analog front end circuit 47. The control signal 51 is a reference signal which is used to control the optical pick-up unit 50 to emit laser beams. The analog front end circuit 47 generates a writing voltage 52 according to the control signal 51 so as to control the laser power outputted from the optical pick-up unit 50. The optical pick-up unit 50 generates a watching signal 53 and outputs different laser power according to the different writing voltage 52. The analog front end circuit 47 provides a reference voltage 54 of the watching signal 53. The analog front end circuit 47 comprises a automatic power control (APC) circuit 48 for adjusting the writing voltage 52 by using a difference amount between the watching signal 53 and the reference voltage 54 so as to steady the laser power outputted from the optical pick-up unit 50. The watching signal 53 and the reference voltage 54 are inputted into the differential amplifier 49 at the same time and then a difference amount 55 between the watching signal 53 and the reference voltage 54 is generated. The ADC 46 converts the difference amount 55 into the digital signal and feeds back the converted digital signal to the microprocessor 42 for further adjusting the control signal 51. The optical disk drive of the present embodiment is a rewritable compact disk drive or a recordable compact disk drive.

Figure 4:
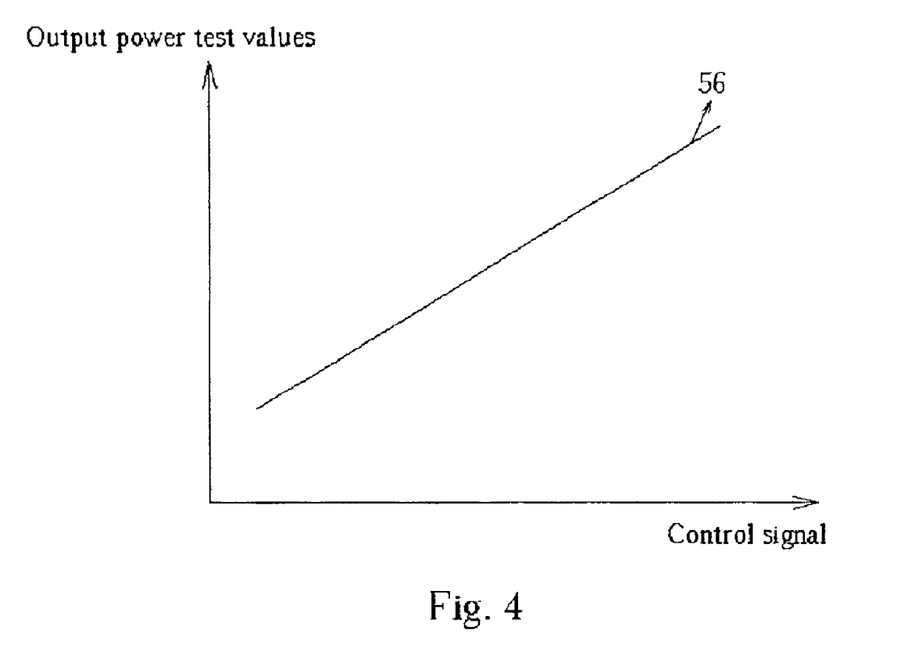
FIG. 4 is a perspective view of a reference function according to the present invention.

Please refer to FIG. 4. FIG. 4 is a perspective view of the reference function 56 according to the present invention. The horizontal axle represents the value of the control signal 51. The vertical axle represents test values of the output power (the difference amount between the watching signal 53 and the reference voltage 54). Before the laser power control device 40 of the present invention optical disk drive performs the output power control of the optical pick-up unit 50, the laser power control device 40 must get a reference function 56 to be the reference value for adjusting the laser power. At first, the microprocessors of the plurality of optical disk drives generate the plurality of control signals. Then, the difference amounts between the watching signals and the reference voltages corresponding to the plurality of control signals are measured. Then second functions corresponding to the plurality of the optical disk drives are generated according to the control signals and the corresponding difference amount between the voltages. Therefore, each optical disk drive generates a different second function after testing. Finally, the reference function 56 is generated by averaging the plurality of second functions. Therefore, the present invention uses the plurality of optical disk drives to be the optical disk sample drive, and then calculates the average value of the corresponding output power test value according to the control signal 51. The reference function 56 corresponding to the control signals 51 and the average value of the output power test values is generated last.

Figure 5:
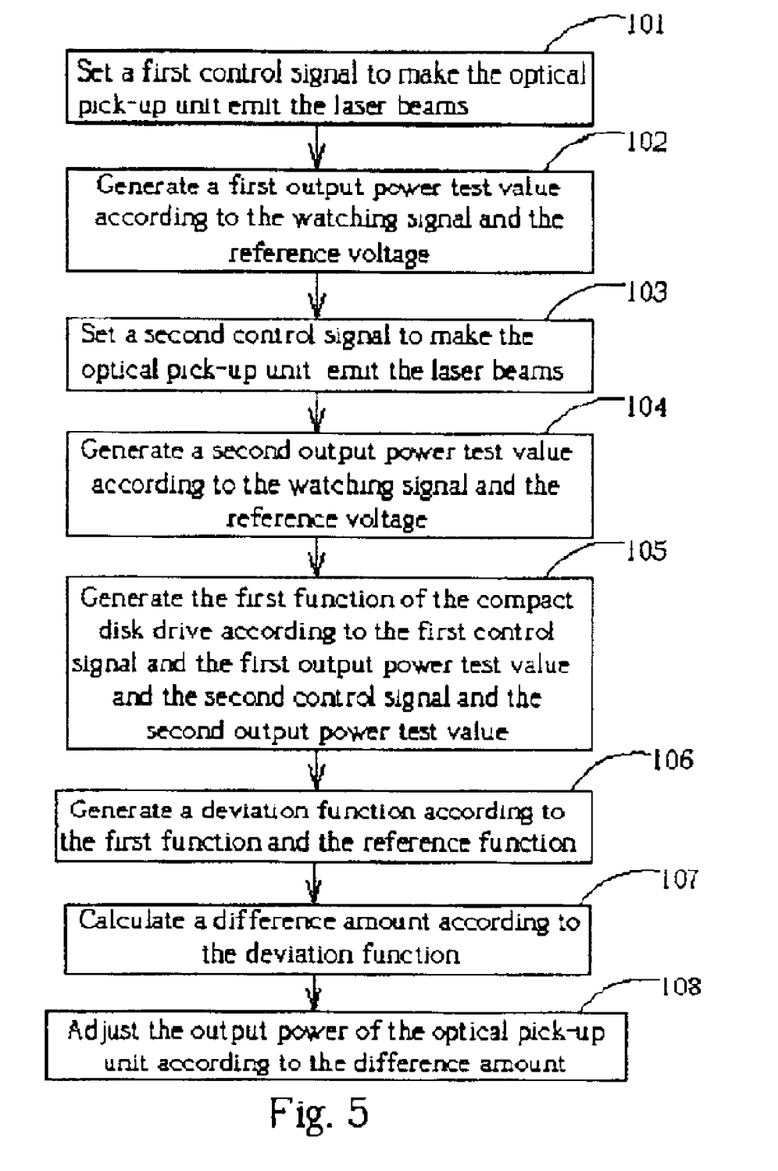
FIG. 5 is a flow chart of the laser power control device shown in FIG. 3.

Please refer to FIG. 5. FIG. 5 is a flow chart of the laser power control device 40 shown in FIG. 3. The operation procedure is described as below:

Step 101: The microprocessor 42 outputs a first control signal Y1 so as to make the optical pick-up unit 50 emit the laser beams;

Step 102: The differential amplifier 49 generates a first output power test value X1 according to the watching signal 53 and the reference voltage 54; Step 103: The microprocessor 42 outputs a second control signal Y2 so as to make the optical pickup unit 50 emit the laser beams;

Step 104: The differential amplifier 49 generates a second output power test value X2 according to the watching signal 53 and the reference voltage 54; Step 105: Generate the first function of the optical disk drive according to the first control signal Y1 and the first output power test value X1, and the second control signal Y2 and the second output power test value X2;

Step 106: Generate a deviation function according to the first function and the reference function 56; Step 107: Calculate a difference amount according to the deviation function; and Step 108: Adjust the output power of the optical pick-up unit 50 according to the difference amount.

Figure 6:
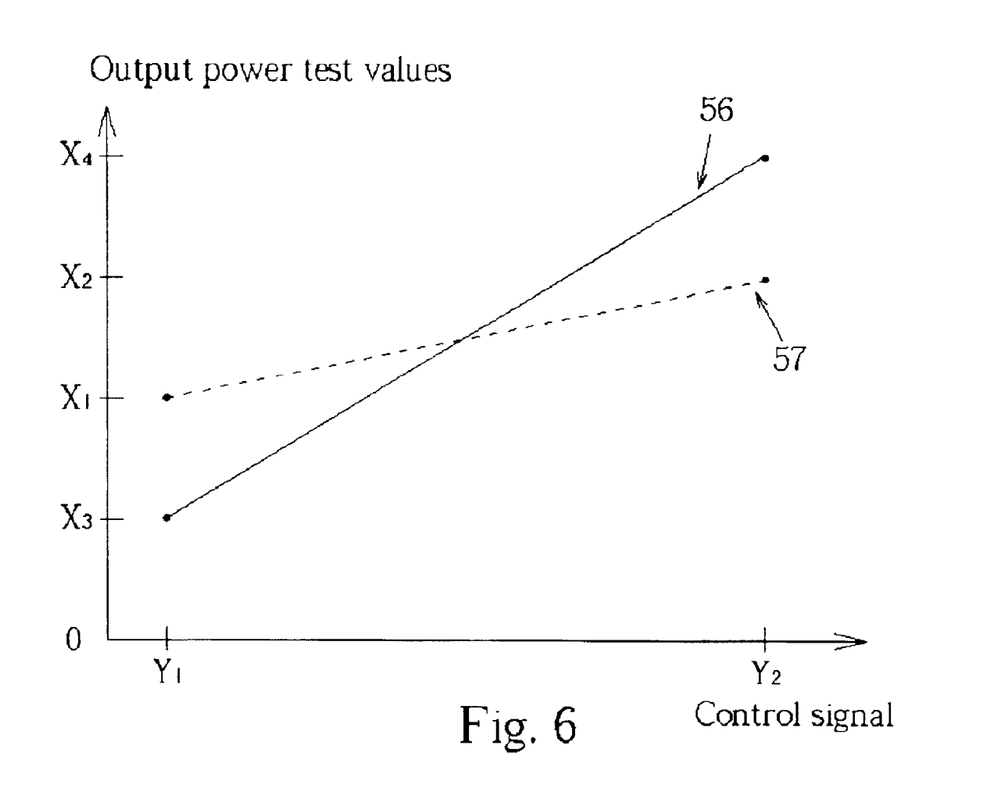
FIG. 6 is a perspective view of the first function of the present invention optical disk drive.
Figure 7:
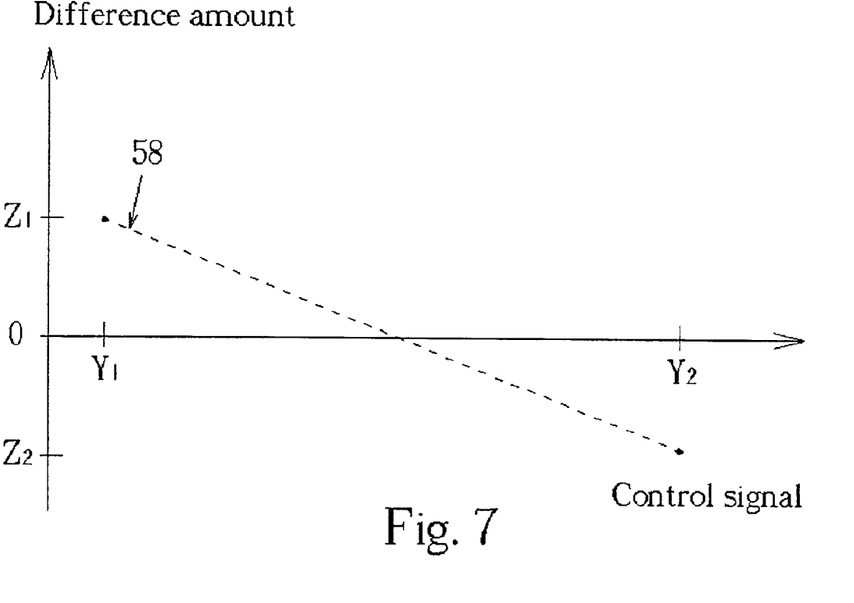
FIG. 7 is a perspective view of the deviation function of the present invention optical disk drive.

Please refer to FIG. 5, FIG. 6, and FIG. 7. FIG. 6 is a perspective view of the first function 57 of the present invention optical disk drive. FIG. 7 is a perspective view of the deviation function 58 of the present invention optical disk drive. In the present embodiment, the first control signal Y1 is an initial value that makes the optical pick-up unit 50 start to generate laser beams. As shown in FIG. 6, when the microprocessor 42 outputs the first control signal Y1 to make the optical pick-up unit 50 output the first laser power, the differential amplifier 49 generates the first output power test value X1 corresponding to the first laser power according to the watching signal 53 and the reference voltage 54 at the same time. Similarly, when the microprocessor 42 outputs the second control signal Y2 to make the optical pick-up unit 50 output the second laser power, the differential amplifier 49 generates the second output power test value X2 corresponding to the second laser power according to the watching signal 53 and the reference voltage 54 at the same time. Therefore, the first function 57 can be calculated by using the first control signal Y1 and the first output power test value X1, and the second control signal Y2 and the second output power test value X2. When the control signal is Y1, a output power test value X3 can be obtained from the reference function 56. Therefore, the laser output power of the optical pick-up unit 50 of the optical disk drive is greater than the output power test value X3, and the difference amount is X1−X3. When the control signal is Y2, an output power test value X4 can be obtained from the reference function 56. Therefore, the laser output power of the optical pick-up unit 50 of the optical disk drive is smaller than the output power test value X4, and the difference amount is X2−X4. The deviation function 58 can be obtained according to the relationship between the difference amounts Z1 (X1−X3), Z2 (X2−X4), and the control signals Y1 and Y2. As shown in FIG. 7, for each control signal, a corresponding difference amount can be obtained. The analog front end circuit 47 adjusts the writing voltage 52 according to the difference amount so as to change the output power of the optical pick-up unit 50. Therefore, the first function 57 of the optical disk drive can conform the laser power characteristic of the reference function 56 after suitable adjusting. The optical disk drive can use a write strategy corresponding to the reference function 56 to write data onto the optical disk so as to make more accurate when writing data onto the optical disk.

In addition, the optimum power control uses the test area on the optical disk to do the laser power test. The size of the test area is limited. The number of times the optimum power control is performed is limited by the capacity of the test area. Therefore, there is a limitation to using the optimum power control to adjust the laser power range. However, the error of the output laser power of the optical pick-up unit and the voltage drift of the electronic circuit always causes large deviations of the laser power so that the suitable writing power cannot be obtained by using the optimum power control. In order to reduce the difference among the different optical disk drives and to control the stability of the output laser power of the optical pick-up unit effective, the laser power control device 40 of the present invention optical disk drive uses the differential amplifier 49 to feedback the output status of the optical pick-up unit 50 to the microprocessor 42. A difference amount can be obtained after comparing the output status with the reference function 56. Using the difference amount to change the writing voltage 52 of the analog front end circuit 47. The feedback mechanism is used to automatically adjust the output power of the optical pick-up unit 50 so as to compensate the error of the output power caused by the optical pick-up unit 50 and the electronic circuit. Then the automatic power control (APC) circuit 48 of the front end circuit 47 is used to further steady the output power of the optical pick-up unit 50. The different optical pick-up unit and the different electronic circuit will give the different influence level to the output laser power, so that the different optical disk drive has the different laser power characteristic. However, the laser power control device 40 of the present invention optical disk drive uses the feedback mechanism to automatically adjust each optical disk drive, which has the different first function 57, to the laser power output characteristic represented by the reference function 56. After suitable adjusting, the laser output power range of the optical pick-up unit of each optical disk drive is fixed (decided by the reference function 56). Therefore, the laser power control device 40 of the present invention optical disk drive can reduce the deviation of the output laser power caused by the error of the output laser power of the optical pick-up unit and the voltage drift of the electronic circuit. When doing the optimum power control, the laser power control device 40 can use the output laser power range defined by the reference function 56 to calibrate the writing power so as to save the time and space of testing on the optical disk and find a suitable writing power quickly.

In contrast to the prior art, the laser power control device of the present invention optical disk drive reduces the deviation of the output laser power caused by the error of the output laser power of the optical pick-up unit and voltage drift of the electronic circuit, increasing the stability of output laser power control. The successful rate of the optimum power control can be increased inside a stable output laser power range so as to avoid selecting an unsuitable writing power and causing the optical disk cannot be read or read correctly after burning data onto the disk, increasing the efficiency of the optical disk drive. Moreover, the present invention optical pick-up unit automatically adjusts the output laser power. Therefore, it can decrease the error caused by using manpower to adjust the output laser power, so that costs are decreased and yield is increased.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An automatic control method for generating stable laser power of an optical disk drive, the optical disk drive comprising:
    an optical pick-up unit for emitting laser beams;
    a microprocessor for generating control signals; and
    an analog front end (AFE) circuit for receiving the control signals generated by the microprocessor, generating a writing voltage for the optical pick-up unit according to the control signals so as to make the optical pick-up unit emit laser beams, receiving watching signals generated when the optical pick-up unit emits laser beams, and adjusting the writing voltage according to a difference amount between the watching signals and a reference voltage so as to adjust a magnitude of the laser beams emitted by the optical pick-up unit;

the control method comprising:
    generating a first function according to a relationship between the control signals transmitted from the microprocessor to the analog front end circuit and the difference amount between the watching signals and the reference voltage;
    wherein when the analog front end circuit receives the watching signal, the analog front end circuit adjusts the writing voltage according to the first function and a reference function so as to adjust the magnitude of the laser beams emitted by the optical pick-up unit.

2. The automatic control method of claim 1 wherein generating the first function comprises:
    using the microprocessor to generate a plurality of control signals;
    measuring a plurality of difference amounts between the watching signals and the reference voltage corresponding to the plurality of control signals; and
    generating the first function according to the plurality of control signals and the plurality of difference amounts between the watching signals and the reference voltage.

3. The automatic control method of claim 1 wherein the reference function is generated by:
    generating second functions corresponding to a plurality of optical disk drives; and
    generating the reference function according to the second function of each optical disk drive of the plurality of optical disk drives.

4. The automatic control method of claim 3 wherein generating the second function of each optical disk drive comprises:
    using the microprocessor of the optical disk drive to generate a plurality of control signals;
    measuring a plurality of difference amounts between the watching signals and the reference voltage corresponding to the plurality of control signals; and
    generating the second function according to the plurality of control signals and the plurality of difference amounts between the watching signals and the reference voltage.

5. The automatic control method of claim 1 wherein the control signal is an initial value that makes the optical pick-up unit of the optical disk drive start to generate laser beams.

6. The automatic control method of claim 1 wherein the optical disk drive further comprises a differential amplifier for calculating the difference amount between the watching signals and the reference voltage.

7. The automatic control method of claim 6 wherein the optical disk drive further comprises an analog to digital converter (ADC) for converting output signals of the differential amplifier into digital signals and transmitting the converted digital signals to the microprocessor.

8. The automatic control method of claim 1 wherein the optical disk drive further comprises a digital to analog converter (DAC) for converting the control signals generated by the microprocessor into analog signals and transmitting the converted analog signals to the analog front end circuit.

9. The automatic control method of claim 1 wherein the optical disk drive is a rewritable compact disk drive (CD-RW drive).

10. The automatic control method of claim 1 wherein the optical disk drive is a recordable compact disk drive (CD-R drive).

11. An optical disk drive comprising:
   an optical pick-up unit for emitting laser beams;
   a microprocessor for generating control signals; and
   an analog front end (AFE) circuit for receiving the control signals generated by the microprocessor, generating a writing voltage for the optical pick-up unit according to the control signals so as to make the optical pick-up unit emit laser beams, receiving watching signals generated when the optical pick-up unit emits laser beams, and adjusting the writing voltage according to a difference amount between the watching signals and a reference voltage so as to adjust a magnitude of the laser beams emitted by the optical pick-up unit;
   wherein a first function is generated by a relationship between the control signals transmitted from the microprocessor to the analog front end circuit and a difference amount between the watching signals and the reference voltage, wherein when the analog front end circuit receives the watching signals, the analog front end circuit adjusts the writing voltage according to the first function and a reference function so as to adjust the magnitude of the laser beams emitted by the optical pick-up unit.

12. The optical disk drive of claim 11 wherein generating the first function comprises:
   using the microprocessor to generate a plurality of control signals;
   measuring a plurality of difference amounts between the watching signals and the reference voltage corresponding to the plurality of control signals; and
   generating the first function according to the plurality of control signals and the plurality of difference amounts between the watching signals and the reference voltage.

13. The optical disk drive of claim 11 wherein the reference function is generated by:
   generating second functions corresponding to a plurality of optical disk drives; and
   generating the reference function according to the second function of each optical disk drive of the plurality of optical disk drives.

14. The optical disk drive of claim 13 wherein generating the second function of each optical disk drive comprises:
   using the microprocessor of the optical disk drive to generate a plurality of control signals;
   measuring a plurality of difference amounts between the watching signals and the reference voltage corresponding to the plurality of control signals; and
   generating the second function according to the plurality of control signals and the plurality of difference amounts between the watching signals and the reference voltage.

15. The optical disk drive of claim 11 wherein the control signal is an initial value that makes the optical pick-up unit of the optical disk drive start to generate laser beams.

16. The optical disk drive of claim 11 further comprising a differential amplifier for calculating the difference amount between the watching signals and the reference voltage.

17. The optical disk drive of claim 16 further comprising an analog to digital converter (ADC) for converting output signals of the differential amplifier into digital signals and transmitting the converted digital signals to the microprocessor.

18. The optical disk drive of claim 11 further comprising a digital to analog converter (DAC) for converting the control signals generated by the microprocessor into analog signals and transmitting the converted analog signals to the analog front end circuit.

19. The optical disk drive of claim 11 being a rewritable compact disk drive (CD-RW drive).

20. The optical disk drive of claim 11 being a recordable compact disk drive (CD-R drive).

21. A computer system comprising an optical disk drive, the optical disk drive comprising:
   an optical pick-up unit for emitting laser beams;
   a microprocessor for generating control signals; and
   an analog front end (AFE) circuit for receiving the control signals generated by the microprocessor, generating a writing voltage for the optical pick-up unit according to the control signals so as to make the optical pick-up unit emit laser beams, receiving watching signals generated when the optical pick-up unit emits laser beams, and adjusting the writing voltage according to a difference amount between the watching signals and a reference voltage so as to adjust a magnitude of the laser beams emitted by the optical pick-up unit;
   wherein a first function is generated by a relationship between the control signals transmitted from the microprocessor to the analog front end circuit and a difference amount between the watching signals and the reference voltage, wherein when the analog front end circuit receives the watching signals, the analog front end circuit adjusts the writing voltage according to the first function and a reference function so as to adjust the magnitude of the laser beams emitted by the optical pick-up unit.

22. The computer system of claim 21 wherein generating the first function comprises:
   using the microprocessor to generate a plurality of control signals;
   measuring a plurality of difference amounts between the watching signals and the reference voltage corresponding to the plurality of control signals; and
   generating the first function according to the plurality of control signals and the plurality of difference amounts between the watching signals and the reference voltage.

23. The computer system of claim 21 wherein the reference function is generated by:
   generating second functions corresponding to a plurality of optical disk drives; and
   generating the reference function according to the second function of each optical disk drive of the plurality of optical disk drives.

24. The computer system of claim 23 wherein generating the second function comprises:
   using the microprocessor of the optical disk drive to generate a plurality of control signals;
   measuring a plurality of difference amounts between the watching signals and the reference voltage corresponding to the plurality of control signals; and
   generating the second function according to the plurality of control signals and the plurality of difference amounts between the watching signals and the reference voltage.

25. The computer system of claim 21 wherein the control signal of the optical disk drive is an initial value that makes the optical pick-up unit of the optical disk drive start to generate laser beams.

26. The computer system of claim 21 wherein the optical disk drive further comprises a differential amplifier for calculating the difference amount between the watching signals and the reference voltage.

27. The computer system of claim 26 wherein the optical disk drive further comprises an analog to digital converter (ADC) for converting output signals of the differential amplifier into digital signals and transmitting the converted digital signals to the microprocessor.

28. The computer system of claim 21 wherein the optical disk drive further comprises a digital to analog converter (DAC) for converting the control signals generated by the microprocessor into analog signals and transmitting the converted analog signals to the analog front end circuit.

29. The computer system of claim 21 wherein the optical disk drive is a rewritable compact disk drive (CD-RW drive).

30. The computer system of claim 21 wherein the optical disk drive is a recordable compact disk drive (CD-R drive).

* * * * *